(12) United States Patent
Huang et al.

(10) Patent No.: US 11,463,801 B2
(45) Date of Patent: Oct. 4, 2022

(54) MOBILE TERMINAL

(71) Applicant: Huawei Technologies Co., Ltd., Shenzhen (CN)

(72) Inventors: Bo Huang, Shanghai (CN); Weihua Mao, Shanghai (CN); Ren Lv, Shanghai (CN); Peng Zha, Shanghai (CN); Zhixiao Xu, Shanghai (CN); Wangyi Li, Shanghai (CN); Lei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 16/979,758

(22) PCT Filed: Mar. 26, 2018

(86) PCT No.: PCT/CN2018/080553
§ 371 (c)(1),
(2) Date: Sep. 10, 2020

(87) PCT Pub. No.: WO2019/183773
PCT Pub. Date: Oct. 3, 2019

(65) Prior Publication Data
US 2021/0021924 A1 Jan. 21, 2021

(51) Int. Cl.
*H04R 1/10* (2006.01)
*H04M 1/02* (2006.01)

(52) U.S. Cl.
CPC ........ *H04R 1/1091* (2013.01); *H04M 1/0264* (2013.01); *H04M 1/0266* (2013.01); *H04R 2499/11* (2013.01)

(58) Field of Classification Search
CPC ....................................................... G06F 1/16
See application file for complete search history.

(56) References Cited

U.S. PATENT DOCUMENTS

| | | | |
|---|---|---|---|
| 2013/0328051 A1 | 12/2013 | Franklin et al. | |
| 2016/0357433 A1* | 12/2016 | Song | G06F 3/04817 |
| 2017/0134547 A1 | 5/2017 | Zeng et al. | |

(Continued)

FOREIGN PATENT DOCUMENTS

| | | |
|---|---|---|
| CN | 105721636 A | 6/2016 |
| CN | 105827915 A | 8/2016 |
| CN | 205545452 U | 8/2016 |

(Continued)

*Primary Examiner* — Jerry Wu
(74) *Attorney, Agent, or Firm* — Conley Rose, P.C.

(57) ABSTRACT

A mobile terminal includes a display screen, an earpiece assembly, and a camera. The earpiece assembly includes an earpiece and a sound conduction tube in communication with the earpiece. They form a stepped structure, and a surface that is used to connect to the sound conduction tube is a first stepped surface. The camera includes a body and a lens connected to the body; the body and the lens form a stepped structure, and a surface that is on the body and that is used to connect to the lens is a second stepped surface. The display screen is provided with a notch, and the sound conduction tube and the lens are located in the notch. In a direction perpendicular to the display screen, the display screen covers a part of the first stepped surface and/or a part of the second stepped surface.

17 Claims, 4 Drawing Sheets

(56) References Cited

U.S. PATENT DOCUMENTS

2017/0324892 A1 11/2017 Kim et al.
2019/0098121 A1* 3/2019 Jeon ........................ H04M 1/18

FOREIGN PATENT DOCUMENTS

| | | |
|---|---|---|
| CN | 106453722 A | 2/2017 |
| CN | 106506742 A | 3/2017 |
| CN | 106708201 A | 5/2017 |
| CN | 106940584 A | 7/2017 |
| CN | 206640638 U | 11/2017 |
| EP | 3109727 A2 | 12/2016 |
| JP | 2015037199 A | 2/2015 |

* cited by examiner

MOBILE TERMINAL

CROSS-REFERENCE TO RELATED APPLICATIONS

This application is a national stage of International Patent Application No. PCT/CN2018/080553, filed on Mar. 26, 2018, which is hereby incorporated by reference in its entirety.

TECHNICAL FIELD

This application relates to the field of communications technologies, and in particular, to a mobile terminal.

BACKGROUND

With popularization of intelligent terminals, implementing a higher screen-to-body ratio (a ratio of a display area of a display screen to an area of a front panel of a mobile terminal) has always been a research direction of various mobile phone manufacturers. However, stacking of components such as a camera, a distance detection sensor, an environment detection sensor, and an earpiece on the front top of the screen affects an increase in the screen-to-body ratio. As shown in FIG. 1 and FIG. 2, FIG. 2 is a sectional view of A-A in FIG. 1. On a mobile terminal, an earpiece 3, a part of a sensor 4, and a camera 5 are sequentially stacked in an X direction, and an environment detection sensor 6 and the earpiece 3 are sequentially stacked in a Y direction, so that a groove opening 2 in the middle of a display area on the top of a front screen 1 of the mobile terminal is relatively long in the X direction and the Y direction. Consequently, a screen-to-body ratio of the mobile terminal is relatively low, and a display effect is affected.

SUMMARY

This application provides a mobile terminal, used to increase a screen-to-body ratio of the mobile terminal.

According to a first aspect, a mobile terminal is provided. The mobile terminal includes a display screen, an earpiece assembly, and a camera. The earpiece assembly includes an earpiece and a sound conduction tube in communication with the earpiece. In addition, in arrangement, a size of the earpiece is greater than a size of the sound conduction tube, so that the earpiece and the sound conduction tube form a stepped structure. The surface that is of the earpiece and that is used to connect to the sound conduction tube is a first stepped surface. In addition, the camera also includes two parts: a body and a lens connected to the body. During disposing, a size of the body is greater than a size of the lens, so that the body and the lens form a stepped structure. A surface that is of the body and that is used to connect to the lens is a second stepped surface.

When the earpiece assembly and the camera are assembled on the display screen, the display screen is provided with a notch. The sound conduction tube and the lens are located in the notch: and in a first direction, the display screen covers a part of the first stepped surface and/or the second stepped surface, where the first direction is a direction perpendicular to a display face of the display screen. Specifically, the covering of the display screen includes: the display screen covers only a part of the first stepped surface, the display screen covers only a part of the second stepped surface, or the display screen covers both a part of the first stepped surface and a part of the second stepped surface.

In the foregoing technical solutions, the earpiece assembly is lowered, so that the earpiece and the display screen are stacked in the first direction, thereby reducing an area that the earpiece occupies on the display screen, reducing a size of the notch, and further increasing a screen-to-body ratio of the mobile terminal.

In a specific implementation solution, to increase the screen-to-body ratio and reduce an opening size of the sound conduction tube, specifically, an opening that is of the sound conduction tube and that is connected to the earpiece is a first opening, an opening that is of the sound conduction tube and that is located on a side of the display surface of the display screen is a second opening, and the sound conduction tube gradually narrows in the first direction. When the sound conduction tube is disposed in a manner of gradually narrowing, the second opening is relatively small, so that an area of the notch can be further reduced, and the screen-to-body ratio of the mobile terminal is increased.

In a specific implementation solution, to further increase the screen-to-body ratio, the sound conduction tube uses a stepped structure, and in the first direction, the display screen covers a part of the sound conduction tube. In this way, the display screen covers the sound hole of the earpiece from above, thereby further reducing the size of the notch and increasing the screen-to-body ratio. In addition, in specific arrangement, the second opening is a circular opening.

In a specific implementation solution, the lens and the sound conduction tube are arranged side by side. In this case, on the display surface of the display screen, a depth direction of the notch is a second direction, and the lens and the sound conduction tube are arranged in a third direction that is perpendicular to the second direction. When the structure is used, in the first direction, the display screen covers a part of the first stepped surface and a part of the second stepped surface. In this way, the area of the notch is further reduced, and the screen-to-body ratio is increased.

In a specific implementation solution, the mobile terminal further includes a sensor assembly, and the sensor assembly is disposed between the sound conduction tube and the lens. A gap between the lens and the sound conduction tube is used to accommodate the sensor assembly, so that space can be fully utilized, and the screen-to-body ratio of the mobile terminal can be further improved.

In a specific implementation solution, the mobile terminal further includes a sensor assembly. The sensor assembly, the lens, and the sound conduction tube are arranged in a shape of an upside-down triangle, and the lens is located below the sound conduction tube in a depth direction of the notch. In addition, during specific disposing, a cover plate is disposed on the display screen of the mobile terminal, a gap located above the sensor assembly is provided on a top of the cover plate, and the gap is in communication with the sound conduction tube.

In a specific implementation solution, the mobile terminal further includes a charging indicator, where the charging indicator is disposed between the sensor assembly and the sound conduction tube.

In a specific implementation solution, locations of the second opening and the first opening are staggered in the first direction for convenience of the disposition of the earpiece.

In a specific implementation solution, a chamfer is provided at a joint between the notch and a side edge of the display screen. Therefore, a size of the notch may be increased on an edge of the display screen, so that arrangement of components is more convenient.

In a specific implementation solution, a middle frame of the mobile terminal and the sound conduction tube are an integrated structure.

In a specific implementation solution, a support structure is further included, where the support structure is provided with an accommodation slot used to accommodate the earpiece, the earpiece is fastened in the accommodation slot, the sound conduction tube and the support structure are an integrated structure, and a through hole in the sound conduction tube is in communication with the accommodation slot.

In a specific implementation solution, the support structure has a support protrusion, and the sensor assembly is fastened to the support protrusion.

In a specific implementation solution, the sound conduction tube is connected to the earpiece in a sealed manner by using sealant, thereby improve a sealing effect.

In a specific implementation solution, the sensor assembly includes an environment detection sensor and a distance detection sensor. Therefore, different signal information can be detected.

It can be learned from the foregoing description that, in the mobile terminal provided in this application, the earpiece assembly and the camera component that occupy relatively large space are disposed in a lowering manner. Only components that occupy relatively small space in the earpiece assembly and in the camera are disposed in the notch, so that a size of the notch can be effectively reduced, thereby improving the screen-to-body ratio of the mobile terminal.

DESCRIPTION OF EMBODIMENTS

To make the objectives, technical solutions, and advantages of this application clearer, the following further describes this application in detail with reference to the accompanying drawings.

To facilitate description of a mobile terminal provided in embodiments of this application, a notch and a stepped structure are first described. The notch mentioned in the embodiments of this application is an opening provided at an edge position of a display screen. When the display screen has a specific thickness, the opening threads through the display screen in a thickness direction of the display screen. The thickness direction of the display screen is a direction perpendicular to a display surface of the display screen. The stepped structure mentioned in the embodiments of this application is a polyhedron structure including at least two layers, and a maximum cross-sectional area of each layer of polyhedron structure gradually decreases in a specific direction. A polyhedron structure with a larger maximum cross-sectional area in two adjacent polyhedron structures is referred to as a bottom layer, and a polyhedron structure with a smaller maximum cross-sectional area is referred to as a top layer. A surface on which a bottom-layer polyhedron structure is connected to a top-layer polyhedron structure is referred to as a stepped surface; or a visible surface in an area from a maximum cross section of a bottom-layer polyhedron structure to a surface on which the bottom-layer polyhedron structure is connected to a top-layer polyhedron structure is referred to as a stepped surface.

In the embodiments of this application, to increase a screen-to-body ratio of a mobile terminal, a mobile terminal is provided. In the mobile terminal, disposing positions of a camera and an earpiece assembly are improved, so that an area of a part that is of the camera and the earpiece assembly and that is exposed outside a display screen is reduced, thereby reducing a size of a notch on the display screen. When the notch (a non-display area) on the display screen decreases, a display area can be correspondingly increased. It can be learned from a formula: screen-to-body ratio of the mobile terminal=display area of the display screen/front panel area of the mobile terminal that the screen-to-body ratio of the display screen on the mobile terminal may be improved by reducing an area of the notch.

Figure 3:
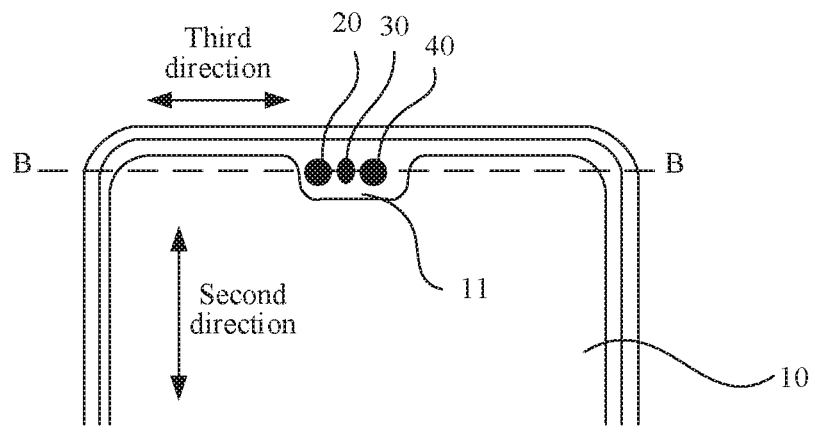
FIG. 3 is a schematic structural diagram of a mobile terminal according to this application.
Figure 4:
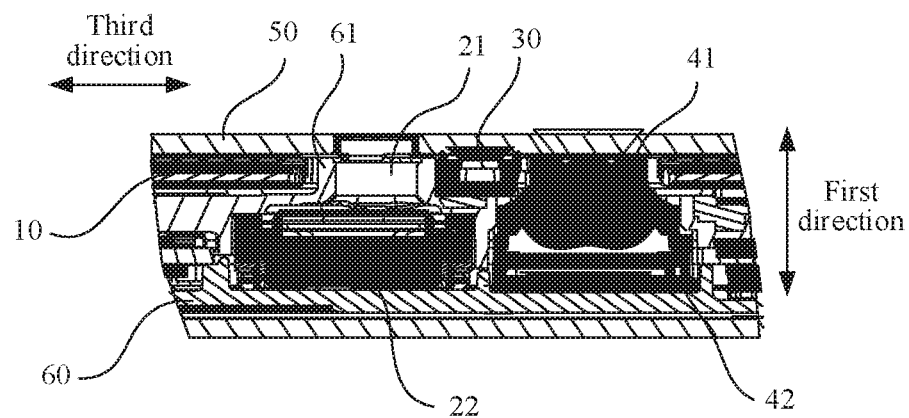
FIG. 4 is a schematic structural diagram of B-B in FIG. 3.

For ease of describing structures of the camera and the earpiece assembly and locations of the camera and the earpiece assembly relative to the display screen provided in the embodiments of this application, as shown in FIG. 3 and FIG. 4, FIG. 3 is a schematic diagram of a part of the mobile terminal according to the embodiments of this application, and FIG. 4 is a sectional view of B-B in FIG. 3. First, directions on a display screen 10 are set to a first direction, a second direction, and a third direction respectively. The first direction is a direction perpendicular to a display surface of the display screen 10, namely a thickness direction of the display screen 10; the second direction is a depth direction that is of a notch 11 on the display screen 10 and that is on the display surface; and the third direction is a direction perpendicular to the second direction on the display surface. In addition, the display surface of the display screen 10 is defined, and the display surface is a surface that is of the display screen 10 and that is exposed outside the mobile terminal, and is used to display an image.

As shown in FIG. 3, FIG. 3 shows a structure of a mobile terminal according to an embodiment of this application. The mobile terminal includes the display screen 10, an earpiece assembly 20, and a camera 40. During disposing, the earpiece assembly 20 and the camera 40 are disposed side by side on a side that is of the display screen 10 and that is opposite to the display surface. In addition, when the earpiece assembly 20 and the camera 40 are assembled with the display screen 10, as shown in FIG. 4, the display screen 10 and the earpiece assembly 20, and the display screen 10 and the camera 40 are disposed in a stacked manner in the first direction. To improve the screen-to-body ratio of the mobile terminal, in the mobile terminal provided in this embodiment of this application, the display screen 10 covers a part of the earpiece assembly 20 or a part of the camera 40 for implementation. For ease of understanding, the following describes in detail a cooperation relationship between the display screen 10, the earpiece assembly 20, and the camera 40 provided in this embodiment of this application.

Figure 5:
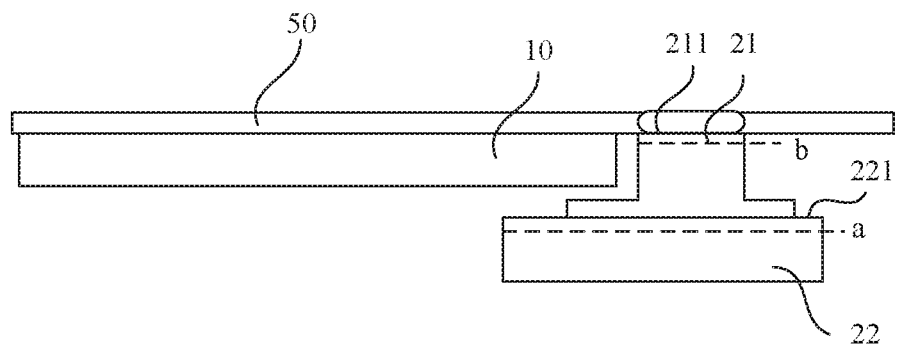
FIG. 5 is a diagram of a position of an earpiece assembly relative to a display screen according to this application.

First, for the earpiece assembly 20, to improve the screen-to-body ratio of the mobile terminal, two components are used for the earpiece assembly 20: an earpiece 22 and a sound conduction tube 21 connected to the earpiece 22. During disposing, the sound conduction tube 21 and the earpiece 22 are arranged in the first direction. With reference to FIG. 4 and FIG. 5, FIG. 5 is a schematic diagram of disposing a position of the earpiece assembly 20 relative to the display screen 10. In a structure shown in FIG. 5, a cross section b is a cross section that is of the sound conduction tube 21 and that is perpendicular to the first direction, and a cross section a is a cross section that is of the earpiece 22 and that is perpendicular to the first direction. It can be learned from FIG. 5 that an area of the cross section b is less than an area of the cross section a, and a stepped structure is formed after the sound conduction tube 21 and the earpiece 22 are assembled. A surface that is on the earpiece 22 and that is used to connect to the sound conduction tube 21 is a first stepped surface 221, and the first stepped surface 221 may be a flat surface, a curved surface, or an irregular surface. When the earpiece assembly 20 is assembled with the display screen 10, the earpiece 22 is disposed in a lowering manner. Specifically, the earpiece 22 is located outside the notch 11, the sound conduction tube 21 is inserted into the notch 11, and the display screen 10 covers a part of the earpiece 22. Referring to FIG. 5, it can be learned from FIG. 5 that the earpiece 22 is located on a side that is of the display screen 10 and that is opposite to the display surface, and the display screen 10 covers a part of the first stepped surface 221. In this disposing manner, because only the sound conduction tube 21 in the earpiece assembly 20 is inserted into the notch 11, a size of only the sound conduction tube 21 affects the notch 11, and a size of the earpiece 22 does not affect the size of the notch 11 on the display screen 10. When the sound conduction tube 21 is disposed, it can be learned from FIG. 5 that the area of the cross section b of the sound conduction tube 21 is less than the area of the cross section a of the earpiece 22. Therefore, on a premise that a size of another component accommodated in the notch 11 remains unchanged, a size of the notch 11 that accommodates the sound conduction tube 21 is less than a size of the notch 11 that accommodates the earpiece 22 in the prior art. On the premise that sizes of a front-end surface and the display screen 10 of the mobile terminal remain unchanged, reduction of the notch 11 is equivalent to an increase in a display area of the display screen 10, thereby increasing the screen-to-body ratio of the mobile terminal.

Figure 7:
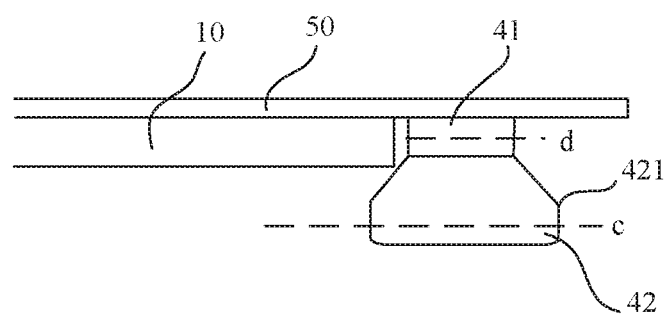
FIG. 7 is a diagram of a position of a camera relative to a display screen according to this application.

Second, for the camera 40, a stepped structure is also used. The camera 40 includes two parts: a body 42 and a lens 41. With reference to FIG. 4 and FIG. 7, FIG. 7 is a schematic diagram of a position of the lens 41 relative to the display screen 10. A cross section c is a cross section that is of the body 42 and that is perpendicular to the first direction, and a cross section d is a cross section that is of the lens 41 and that is perpendicular to the first direction. It can be learned from FIG. 7 that an area of the cross section c is greater than an area of the cross section d, thereby forming a stepped structure. In the formed stepped structure, a surface that is on the body 42 and that is used to connect to the lens 41 is a second stepped surface 421, and the second stepped surface 421 may be a flat surface, a curved surface, or an irregular surface. During assembly, as shown in FIG. 7, the body 42 is located on a side that is of the display screen 10 and that is opposite to the display surface, and the lens 41 is inserted into the notch 11 of the display screen 10. To improve the screen-to-body ratio of the mobile terminal, when the camera 40 is disposed, the display screen 10 covers a part of the body 42. That is, the display screen 10 shown in FIG. 7 covers a part of the second stepped surface 421. A disposing manner is similar to the disposing manner of the earpiece assembly 20. For a specific disposing manner of the camera 40, refer to the foregoing disposing manner of disposing the earpiece assembly 20.

When the foregoing assembly manner is used, it can be learned that by lowering the camera 40 and the earpiece assembly 20, the body 42 and the earpiece 22 that are of relatively large sizes are located outside the notch 11, and only the sound conduction tube 21 and the lens 41 that are of relatively small sizes are disposed in the notch 11, so that an opening area of the notch 11 is effectively reduced, thereby increasing the screen-to-body ratio of the mobile terminal. It should be understood that the foregoing lists an example in which the display screen 10 covers a part of the first stepped surface 221 and a part of the second stepped surface 421, but the following structure may also be used to reduce an area of the notch 11. For example, only a part or all of the first stepped surface 221 is covered, or only a part or all of the second stepped surface 421 is covered. Compared with the display screen in the prior art, the area of the notch 11 may also be reduced by using the foregoing two listed manners, and the screen-to-body ratio of the mobile terminal is increased. Therefore, it can be learned from the foregoing description that, in the display screen 10 provided in this embodiment of this application, when the display screen 10 covers a structure of a part of the first stepped surface 221 and/or a part of the second stepped surface 421, the screen-to-body ratio of the mobile terminal can be increased. That the display screen 10 covers a part of the first stepped surface 221 and/or a part of the second stepped surface 421 may be explained as follows: the display screen 10 covers only a part or all of the first stepped surface 221, or the display screen 10 covers only a part or all of the second stepped surface 421; or the display screen 10 covers a part or all of the first stepped surface 221 and a part or all of the second stepped surface 421 at the same time.

When the sound conduction tube 21 is specifically involved, to further increase the screen-to-body ratio of the mobile terminal, the sound conduction tube 21 in this embodiment of this application uses a structure that gradually narrows in the first direction. As shown in FIG. 4 and FIG. 5, a cross-sectional area of the sound conduction tube 21 gradually decreases in a direction from the earpiece 22 to the notch 11. For ease of description, a first opening and a second opening 211 of the sound conduction tube 21 are defined, where the first opening is an opening connecting the sound conduction tube 21 and the earpiece 22, and the second opening 211 is an opening that is of the sound conduction tube 21 and that is located on a side of the display surface of the display screen 10. The second opening 211 is an opening through which the sound conduction tube 21 is inserted into the notch 11. In this embodiment of this application, to reduce an area that the sound conduction tube 21 occupies in the notch 11, a manner in which the second opening 211 is smaller than the first opening is used. It can be learned from FIG. 4 that the second opening 211 is approximately parallel to the display surface of the display screen 10. Therefore, when the second opening 211 is minimized, the area that the second opening 211 occupies in the notch 11 is also reduced, so that the display area of the display screen 10 can be increased, and the screen-to-body ratio of the mobile terminal can be increased. When the sound conduction tube 21 is disposed, a shape of the sound conduction tube 21 is not limited, provided that a sound loss is less than a set value when the sound conduction tube 21 transmits a sound. The set value may be set according to an actual production requirement. Specifically, a structure of the sound conduction tube 21 may be shown in FIG. 5. The sound conduction tube 21 uses a stepped structure. A part that is of the sound conduction tube 21 and that is connected to the earpiece 22 has a relatively large cross-sectional area, and a part that is of the sound conduction tube 21 and that is located in the notch 11 has a relatively small cross-sectional area. When the structure is used, in a first direction, the display screen 10 covers a part of the sound conduction tube 21 to avoid inserting a sound conduction tube with a relatively large area into the notch 11, and a position of the earpiece 22 may be flexibly disposed.

In addition, in a specific implementation solution, when the sound conduction tube 21 is disposed, the sound conduction tube 21 may be disposed in a manner in which a center line of the second opening 211 deviates from a center line of a sound outlet hole of the earpiece 22. In this case, positions of the second opening 211 and the first opening are staggered in the first direction. In a specific deviation, as shown in FIG. 5, the second opening 211 deviates from sound outlet hole in a direction facing the disposed camera 40, so that the second opening 211 can be closer to the lens 41. In this case, a gap between the sound conduction tube 21 and the lens 41 that are in the notch 11 is reduced, so that the area of the notch 11 may be further reduced, and the display screen 10 may cover more part of the earpiece 22, thereby facilitating arrangement of the earpiece 22.

Figure 6:
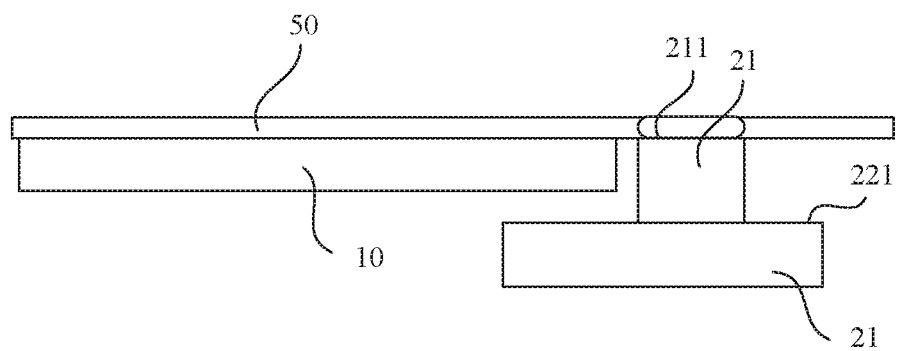
FIG. 6 is a diagram of a position of an earpiece assembly relative to a display screen according to this application.

Certainly, a structure of the sound conduction tube 21 is not limited to the foregoing described stepped structure or a disposing manner of deviating from the earpiece center, and a structure in a shape of a straight tube shown in FIG. 6 may also be used. When the structure in the shape of a straight tube in FIG. 6 is used, the size of the notch 11 may also be reduced.

When the camera 40 and the earpiece assembly 20 are specifically disposed, as shown in FIG. 4, the lens 41 and the sound conduction tube 21 are arranged side by side. In this case, on the display surface of the display screen 10, the lens 41 and the sound conduction tube 21 are arranged in a third direction. When the structure is used, in the first direction, the display screen 10 covers a part of the first stepped surface 221 and a part of the second stepped surface 421. Therefore, the area of the notch 11 is further reduced, and the screen-to-body ratio is increased. In addition, the earpiece assembly 20 and the camera 40 are arranged in the third direction, so that a depth of the notch 11 on the display surface can be reduced. When the structure is used, as shown in FIG. 3, a corresponding notch 11 on the display screen 10 is a rectangular notch 11. A length in the second direction is less than a length in the third direction, to reduce impact of the notch 11 on the display area.

Figure 1:
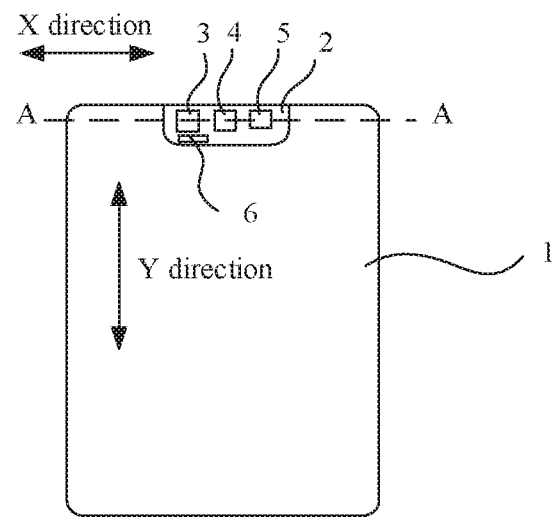
FIG. 1 is a schematic diagram of a structure of a mobile terminal in the prior art.
Figure 2:
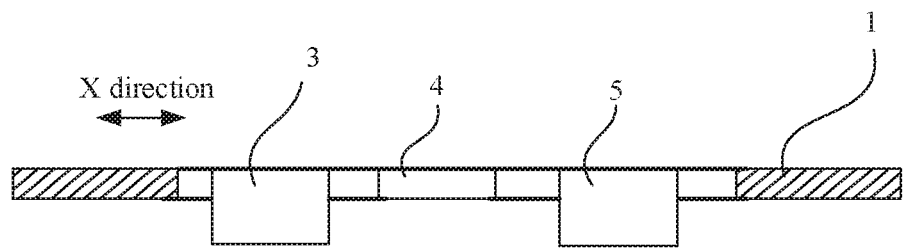
FIG. 2 is a sectional view of A-A in FIG. 1.

In addition, the mobile terminal provided in this embodiment of this application further includes a sensor assembly 30, and the sensor assembly 30 may be an environment detection sensor, a distance detector, a tri-color light, or another common sensor assembly 30. When the sensor assembly 30 is assembled in the notch 11, the sensor assembly 30 is disposed in the gap between the sound conduction tube 21 and the lens 41. In this way, the gap formed between the lens 41 and the earpiece 22 is fully utilized, and no additional space is occupied. When the lens 41, the sensor assembly 30, and the sound conduction tube 21 are specifically disposed, as shown in FIG. 1, in the third direction, the lens 41, the sensor assembly 30, and the sound conduction tube 21 are arranged in a single row. Therefore, a length occupied in the second direction is reduced, equivalent to reducing a depth of the notch 11 on the display surface, thereby reducing impact on a display effect of the display screen 10.

When the earpiece assembly 20 and the camera 40 are specifically assembled, the camera 40 and the earpiece assembly 20 are fastened by using a structure on a middle frame 60. Referring to FIG. 4, it can be learned from FIG. 4 that, in the first direction, a glass cover plate 50, the display screen 10, and the middle frame 60 are sequentially disposed in a structure of the mobile terminal from top to bottom. When the sound conduction tube 21 is specifically disposed, the sound conduction tube 21 uses a structure integrated with the middle frame 60. In this case, a sound conduction groove is formed on the structure of the middle frame 60, and the sound conduction groove is directly formed on the middle frame 60 during preparation. When the earpiece 22 is assembled, the gap between the sound conduction groove and the earpiece 22 is sealed by using foam, to improve a sound propagation effect. When the earpiece 22 and the camera 40 are specifically assembled, a support structure is disposed on the middle frame 60, and an accommodation slot for accommodating the earpiece 22 is provided on the support structure. In addition, the sound conduction tube 21 and the support structure are an integrated structure. In this case, a through hole in the sound conduction tube 21 is in communication with the accommodating slot, that is, the sound conduction groove is provided on the support structure and is in communication with the accommodation slot. When the earpiece 22 is assembled, the earpiece 22 may be directly fastened in the accommodation slot, to implement communication between the sound conduction groove and the earpiece 22. When the sensor assembly 30 is disposed, the support structure has a support protrusion, and the sensor assembly 30 is fastened to the support protrusion, thereby fastening the sensor assembly 30.

It can be learned from the foregoing embodiment that the camera 40 and the earpiece assembly 20 provided in this embodiment of this application use the stepped structure. In addition, when assembled with the display screen 10, components with relatively large sizes in the earpiece assembly 20 and the camera 40 are lowered, so that the component with a relatively small size is disposed inside the notch 11. Therefore, an opening area of the notch 11 is reduced, and the display area of the display screen 10 is increased, thereby increasing the screen-to-body ratio of the mobile terminal.

Certainly, it should be understood that, arranging the foregoing listed lens 41, the sound conduction tube 21, and the sensor assembly 30 in a third direction is a specific disposing manner. The mobile terminal provided in this embodiment of this application may alternatively use another arrangement manner to increase the screen-to-body ratio of the mobile terminal. Another arrangement manner is listed below to further describe the mobile terminal provided in this embodiment of this application.

Figure 8:
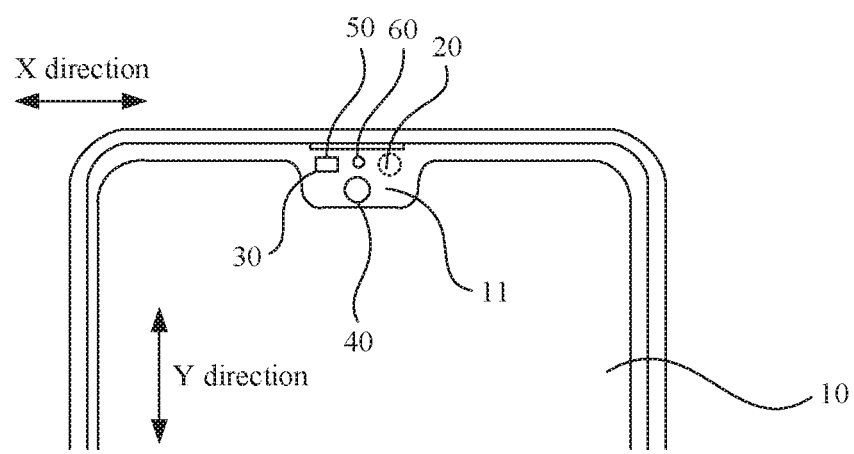
FIG. 8 is a schematic structural diagram of another mobile terminal according to an embodiment of this application.
Figure 9:
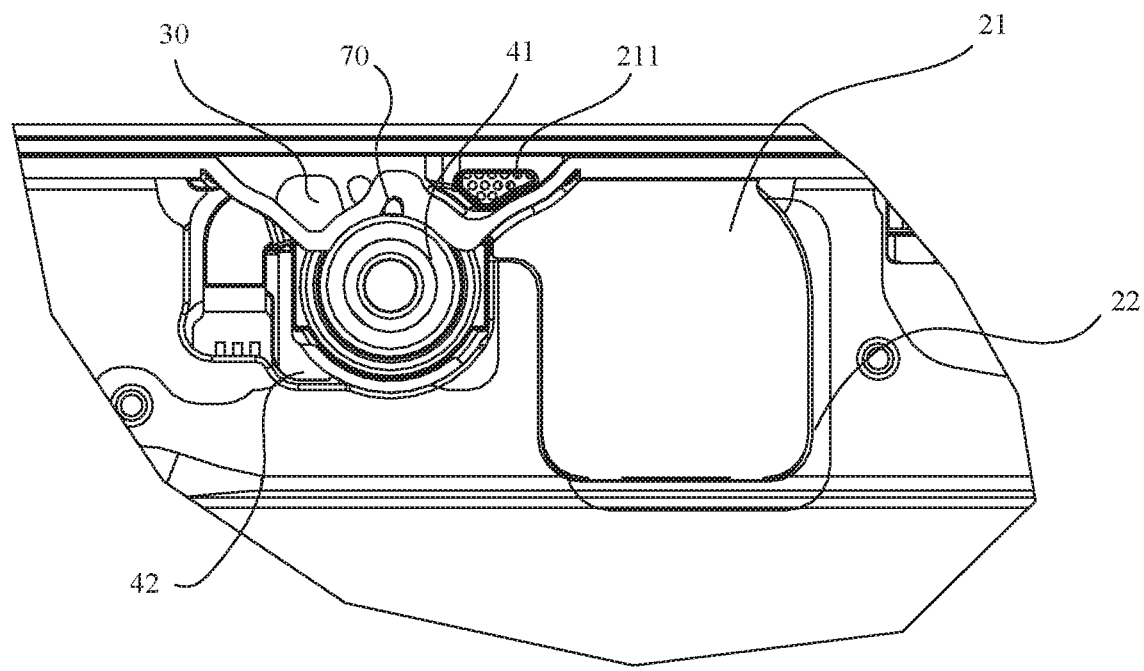
FIG. 9 is a diagram of a position of a camera relative to an earpiece assembly according to an embodiment of this application.

As shown in FIG. 8 and FIG. 9, first, components included in a mobile terminal shown in FIG. 8 include a display screen 10 provided with a notch 11, an earpiece assembly 20, and a camera 40, and both the earpiece assembly 20 and the camera 40 use the stepped structure described above. In the structure shown in FIG. 8, the display screen 10 covers a part of a first stepped surface 221 and a part of a second stepped surface 421, thereby further reducing an area of the notch 11.

Figure 10:
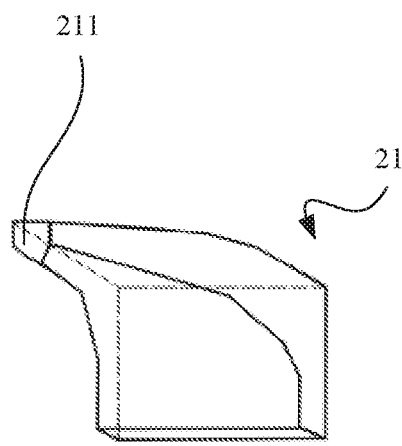
FIG. 10 is a schematic structural diagram of a sound conduction tube according to an embodiment of this application.

During specific disposing, the notch 11 is located in the middle of the top of the display screen 10, and is a U-shaped notch 11. The sensor assembly 30, the lens 41, and the sound conduction tube 21 are arranged in a shape of an upside-down triangle. The lens 41 is located below the sound conduction tube 21 in a depth direction of the notch 11. Still referring to FIG. 8 and FIG. 9, with a disposing direction of the display screen 10 shown in FIG. 8 as a reference direction, the lens 41 is located at the bottom, the sensor assembly 30 is at an upper left corner of the lens 41, and the sound conduction tube 21 is at an upper right corner of the lens 41, thereby forming a structure of an upside-down triangle. As shown in FIG. 10, the sound conduction tube 21 is disposed in a water bag-shaped structure, and a second opening 211 of the sound conduction tube 21 is located outside the earpiece 22. In this case, positions of the second opening 211 and a first opening are staggered in the first direction. In addition, a sound outlet hole in communication with the sound conduction tube 21 is provided on the glass cover plate, and the sound outlet hole is located above the sensor assembly 30 and located at a top position of the display screen 10.

When the structure of an upside-down triangle is used during disposing, both the sensor assembly 30 and the sound conduction tube 21 are partially located in a gap of the stepped structure of the camera 40, so that in the first direction, the sensor assembly 30 and the body 42 of the camera 40 partially overlap, and the sound conduction tube 21 and the body 42 of the camera 40 partially overlap, thereby minimizing an area that the foregoing components occupies in the notch 11.

When the notch 11 is specifically disposed, referring to the structure in FIG. 8, two arc-shaped chamfer structures are provided at a joint between a side wall of the notch 11 and a side edge of the display screen 10, so that the side wall of the notch 11 can be attached to an edge of the lens 41, and a position of the formed chamfer structure can increase the size of an opening end of the notch, thereby accommodating the sensor assembly 30 and the earpiece assembly 20. When this structure is used, a size of a conventional notch 11 can be reduced, and the screen-to-body ratio of the mobile terminal can be increased.

It can be learned from the foregoing description that when the structure is used, a width in the third direction can be well controlled, and a depth in the second direction is only slightly greater than a diameter of the lens 41.

In addition, the mobile terminal provided in this embodiment of this application further includes a charging indicator 70, and the charging indicator 70 is disposed between the sensor assembly 30 and the sound conduction tube 21.

When the sound conduction tube 21 is specifically disposed, the foregoing manner in which the sound conduction tube 21 and the middle frame are an integrated structure may be used. For specific description, refer to the description of the embodiment corresponding to FIG. 4. Details are not described herein again.

It can be learned from the foregoing embodiment that, the camera 40 and the earpiece assembly 20 use a stepped structure, and when assembled with the display screen 10, components with relatively large sizes in the earpiece assembly 20 and the camera 40 are lowered, so that a component with a relatively small size is disposed inside the notch 11. Therefore, regardless of an arrangement manner, the opening area of the notch 11 can be reduced, so that the display area of the display screen 10 can be increased, thereby improving an effect of a screen-to-body ratio of the mobile terminal.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A mobile terminal, comprising:
an earpiece assembly comprising:
an earpiece comprising a first stepped surface; and
a sound conduction tube coupled with the earpiece, wherein the sound conduction tube and the earpiece form a first stepped structure, and wherein the first stepped surface connects to the sound conduction tube; a camera coupled to the earpiece assembly and comprising:
a body comprising a second stepped surface; and
a lens coupled to the body, wherein the body and the lens form a second stepped structure, and wherein the second stepped surface connects to the lens; and
a display screen coupled to the camera and comprising:
a display surface; and
a notch, wherein a sensor assembly, the sound conduction tube and the lens are located in the notch,
wherein the display screen covers a part of the first and second stepped surfaces in a first direction,
wherein the first direction is a direction perpendicular to the display surface of the display screen; and
wherein a middle frame and the sound conduction tube comprise an integrated structure; and a support structure, wherein the support structure comprises an accommodation slot to accommodate the earpiece, wherein the earpiece is fastened in the accommodation slot, wherein the sound conduction tube and the support structure comprise an integrated structure, and wherein the sound conduction tube further comprises a through hole in communication with the accommodation slot.

2. The mobile terminal of claim 1, wherein the sound conduction tube comprises:
a first opening connected to the earpiece; and
a second opening located on a side of the display surface; and
wherein the sound conduction tube narrows in a direction from the first opening to the second opening.

3. The mobile terminal of claim 2, wherein the sound conduction tube comprises a third stepped structure, and wherein the display screen covers a part of the sound conduction tube in the first direction.

4. The mobile terminal of claim 2, wherein a depth direction of the notch is a second direction on the display surface of the display screen, and wherein the lens and the sound conduction tube are arranged in a third direction that is perpendicular to the second direction.

5. The mobile terminal of claim 4, wherein the sensor assembly is disposed between the sound conduction tube and the lens.

6. The mobile terminal of claim 2, wherein the sensor assembly, the lens, and the sound conduction tube are arranged in a shape of a triangle, and wherein the lens is located below the sound conduction tube in a depth direction of the notch.

7. The mobile terminal of claim 6, wherein locations of the second opening and the first opening are staggered in the first direction.

8. The mobile terminal of claim 1, wherein the display screen further comprises a side edge, wherein the notch is connected to the side edge, and wherein the side edge is chamfered.

9. A display screen assembly, comprising:
a display surface having a notch;
an earpiece assembly disposed in the notch and comprising:
an earpiece comprising a first stepped surface; and
a sound conduction tube coupled with the earpiece, wherein the sound conduction tube and the earpiece form a first stepped structure, and wherein the first stepped surface connects to the sound conduction tube;
a camera coupled to the earpiece assembly comprising:
a body comprising a second stepped surface; and
a lens coupled to the body, wherein the body and the lens form a second stepped structure, wherein the second stepped surface connects to the lens, and wherein the lens is disposed in the notch;
a sensor assembly disposed in the notch,
wherein the display surface covers a part of the first and second stepped surfaces in a first direction,
wherein the first direction is a direction perpendicular to the display surface; and
wherein a middle frame and the sound conduction tube comprise an integrated structure, and a support structure, wherein the support structure comprises an accommodation slot to accommodate the earpiece, wherein the earpiece is fastened in the accommodation slot, wherein the sound conduction tube and the support structure comprise an integrated structure, and wherein the sound conduction tube further comprises a through hole in communication with the accommodation slot.

10. The display screen assembly of claim 9, wherein the sound conduction tube comprises:
a first opening connected to the earpiece; and
a second opening located on a side of the display surface; and
wherein the sound conduction tube narrows in a direction from the first opening to the second opening.

11. The display screen assembly of claim 10, wherein the sound conduction tube comprises a third stepped structure, and wherein the display surface covers a part of the sound conduction tube in the first direction.

12. The display screen assembly of claim 10, wherein a depth direction of the notch is a second direction on the display surface, and wherein the lens and the sound conduction tube are arranged in a third direction that is perpendicular to the second direction.

13. The display screen assembly of claim 12, wherein the sensor assembly is disposed between the sound conduction tube and the lens.

14. The display screen assembly of claim 10, wherein the sensor assembly, the lens, and the sound conduction tube are arranged in a shape of a triangle, and wherein the lens is located below the sound conduction tube in a depth direction of the notch.

15. The display screen assembly of claim 14, wherein locations of the second opening and the first opening are staggered in the first direction.

16. The display screen assembly of claim 10, wherein locations of the second opening and the first opening are staggered in the first direction.

17. The display screen assembly of claim 9, wherein the display screen further comprises a side edge, wherein the notch is adjacent to the side edge, and wherein the side edge is chamfered.

* * * * *